(12) United States Patent
Owens

(10) Patent No.: US 7,986,055 B2
(45) Date of Patent: Jul. 26, 2011

(54) ADJUSTMENT OF CONTROL STRATEGY BASED ON TEMPERATURE

(75) Inventor: Richard Owens, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 178 days.

(21) Appl. No.: 12/017,933

(22) Filed: Jan. 22, 2008

(65) Prior Publication Data

US 2009/0184578 A1    Jul. 23, 2009

(51) Int. Cl.
*H02H 7/18* (2006.01)
*H02J 7/00* (2006.01)
(52) U.S. Cl. ..................... 307/10.7; 320/132
(58) Field of Classification Search ............... 307/10.7; 320/132
See application file for complete search history.

(56) References Cited

U.S. PATENT DOCUMENTS

| | | |
|---|---|---|
| 3,820,009 A | 6/1974 | Itoh et al. |
| 3,876,931 A | 4/1975 | Godshalk |
| 4,137,557 A | 1/1979 | Ciarniello et al. |
| 4,390,828 A | 6/1983 | Converse et al. |
| 4,396,880 A | 8/1983 | Windebank |
| 4,424,477 A | 1/1984 | Enoshima et al. |
| 4,527,112 A | 7/1985 | Herman |
| 4,766,862 A | 8/1988 | Hibino et al. |
| 4,848,700 A | 7/1989 | Lockheed |
| 4,852,540 A | 8/1989 | Safranek |
| 4,902,956 A | 2/1990 | Sloan |
| 5,087,869 A | 2/1992 | Kuriyama et al. |
| 5,204,992 A | 4/1993 | Carpenter |
| 5,214,385 A | 5/1993 | Gabriel et al. |
| 5,235,946 A | 8/1993 | Fodale et al. |
| 5,272,380 A | 12/1993 | Clokie |
| 5,280,232 A | 1/1994 | Kohl et al. |
| 5,293,076 A | 3/1994 | Fukui |
| 5,295,078 A | 3/1994 | Stich et al. |
| 5,298,797 A | 3/1994 | Redl |
| 5,300,874 A | 4/1994 | Shimamoto et al. |
| 5,332,958 A | 7/1994 | Sloan |
| 5,343,137 A | 8/1994 | Kitaoka et al. |

(Continued)

FOREIGN PATENT DOCUMENTS

WO    WO 96/11817    4/1996

OTHER PUBLICATIONS

PCT International Search Report, Mar. 13, 2009.

*Primary Examiner* — Michael Rutland Wallis
(74) *Attorney, Agent, or Firm* — Mark E. Duell; Rankin Hill & Clark LLP

(57) ABSTRACT

A method of protecting a battery is provided in a vehicle having a battery that selectively supplies electric power for starting an engine of the vehicle and that selectively supplies electric power to a plurality of electric loads of the vehicle. The method includes: obtaining a temperature; determining a state of charge (SOC) of the battery; determining a first threshold based on the obtained temperature; determining a second threshold based on the obtained temperature, the second threshold being different than the first threshold; taking a first remedial action if the SOC is below the first determined threshold; and taking a second remedial action if the SOC is below the second determined threshold, the second remedial action being different from the first remedial action.

16 Claims, 2 Drawing Sheets

U.S. PATENT DOCUMENTS

| | | | |
|---|---|---|---|
| 5,385,126 A | 1/1995 | Matthews | |
| 5,444,378 A | 8/1995 | Rogers | |
| 5,450,321 A | 9/1995 | Crane | |
| 5,602,462 A | 2/1997 | Stich et al. | |
| 5,621,298 A | 4/1997 | Harvey | |
| 5,668,465 A | 9/1997 | May | |
| 5,684,370 A | 11/1997 | Watanabe | |
| 5,691,619 A | 11/1997 | Vingsbo | |
| 5,693,986 A | 12/1997 | Vettraino, Jr. et al. | |
| 5,699,050 A | 12/1997 | Kanazawa | |
| 5,717,937 A | 2/1998 | Fritz | |
| 5,764,469 A | 6/1998 | Slepian et al. | |
| 5,793,359 A | 8/1998 | Ushikubo | |
| 5,798,577 A | 8/1998 | Lesesky et al. | |
| 5,831,411 A | 11/1998 | Klauer et al. | |
| 5,872,443 A | 2/1999 | Williamson | |
| 5,896,023 A | 4/1999 | Richter | |
| 5,945,808 A * | 8/1999 | Kikuchi et al. | 320/132 |
| 6,066,899 A | 5/2000 | Rund et al. | |
| 6,081,098 A | 6/2000 | Bertness et al. | |
| 6,313,608 B1 | 11/2001 | Varghese et al. | |
| 6,316,914 B1 | 11/2001 | Bertness | |
| 6,331,762 B1 | 12/2001 | Bertness | |
| 6,515,456 B1 | 2/2003 | Mixon | |
| 6,700,386 B2 | 3/2004 | Egami | |
| 6,759,760 B2 | 7/2004 | Gaynier et al. | |
| 6,806,588 B2 * | 10/2004 | Amano et al. | 307/10.7 |
| 6,836,718 B2 | 12/2004 | Hasfjord et al. | |
| 6,871,151 B2 | 3/2005 | Bertness | |
| 7,003,411 B2 | 2/2006 | Bertness | |
| 7,116,078 B2 | 10/2006 | Colombo et al. | |
| 7,126,341 B2 | 10/2006 | Bertness et al. | |
| 7,146,959 B2 | 12/2006 | Thompson et al. | |
| 7,173,347 B2 | 2/2007 | Tani et al. | |
| 2003/0236599 A1 | 12/2003 | Saito et al. | |
| 2004/0189254 A1 | 9/2004 | Kapsokavathis et al. | |
| 2004/0263176 A1 | 12/2004 | Vonderhaar et al. | |
| 2005/0024061 A1 | 2/2005 | Cox et al. | |
| 2005/0068039 A1 | 3/2005 | Bertness | |
| 2005/0162172 A1 | 7/2005 | Bertness | |
| 2005/0285445 A1 | 12/2005 | Wruck et al. | |
| 2006/0214508 A1 * | 9/2006 | Binder | 307/10.7 |
| 2006/0282227 A1 | 12/2006 | Bertness | |
| 2007/0069734 A1 | 3/2007 | Bertness | |
| 2007/0159177 A1 | 7/2007 | Bertness et al. | |

* cited by examiner

ADJUSTMENT OF CONTROL STRATEGY BASED ON TEMPERATURE

BACKGROUND

The present specification relates generally to the automotive arts. More specifically, the present specification relates to a battery protection system and/or method. Particular application is found in connection with an electrical system of a motor vehicle (e.g., an automobile or other vehicle driven by an internal combustion engine), and the specification makes particular reference thereto. However, it is to be appreciated that aspects of the present subject matter are also amenable to other like applications.

As is known in the art, many automotive vehicles generally include an internal combustion or other like engine that drives the vehicle. A modern vehicle is also typically provisioned with an electrical system including: (i) a battery which provides a source of electric power for starting the vehicle's engine; and, (ii) one or more electric circuits or loads (e.g., headlights, clocks, electrically powered adjustable components such as seats, mirrors or steering columns, interior cabin lights, electric heaters for seats, mirrors, windows or the like, radios and/or other entertainment systems, electronic memories for recording radio station presets and/or user preferred seat and/or mirror positions, electronic navigation systems, etc.) that may also be selectively powered by the vehicle's battery. The trend of providing more electronic features and/or devices in a vehicle typically results in addition burden on the vehicle's battery and thus it become even more prudent to pay meaningful consideration to maintaining the health of the battery.

To maintain the general health of a battery in good condition and/or to retain sufficient charge in the battery for starting the vehicle's engine, it is generally advantageous to protect a vehicle's battery from excessive discharge. As can be appreciated, however, some of the foregoing examples of electronic features and/or devices that tax the vehicle's battery are normally of the type that cannot be manually isolated from the vehicle's battery by the driver or other vehicle occupant. Additionally, electrical components and/or devices of a vehicle can be inadvertently left on when their use is no longer desired and/or the vehicle is unattended. Clearly, this can further stress a vehicle's battery unduly.

Accordingly, a new and improved system and/or method for protecting a vehicle battery from excessive discharge is disclosed that overcomes the above-referenced problems and others.

SUMMARY

According to one aspect, a method of protecting a battery is provided in a vehicle having a battery that selectively supplies electric power for starting an engine of the vehicle and that selectively supplies electric power to a plurality of electric loads of the vehicle. The method includes: obtaining a temperature; determining a state of charge (SOC) of the battery; determining a first threshold based on the obtained temperature; determining a second threshold based on the obtained temperature, the second threshold being different than the first threshold; taking a first remedial action if the SOC is below the first determined threshold; and taking a second remedial action if the SOC is below the second determined threshold, the second remedial action being different from the first remedial action.

According to another aspect, a system for protecting a battery is provided in a vehicle having a battery that selectively supplies electric power for starting an engine of the vehicle and that selectively supplies electric power to a plurality of electric loads of the vehicle. The battery protection system includes: temperature sensing means for obtaining a temperature; battery sensing means for determining a state of charge (SOC) of the battery; threshold determining means for determining a first threshold based on the temperature obtained by the temperature sensing means and a second threshold based on the temperature obtained by the temperature sensing means, the second threshold being different than the first threshold; and remedial action means for taking a first remedial action if the SOC is below the first determined threshold and a second remedial action if the SOC is below the second determined threshold, the second remedial action being different from the first remedial action.

According to still another aspect, a battery protection system is provided in a vehicle having a battery that selectively supplies electric power for starting an engine of the vehicle and that selectively supplies electric power to a plurality of electric loads of the vehicle. The battery protection system includes: a first sensor that measures at least one of a temperature of the battery, a temperature of the vehicle's engine and an ambient temperature; a second sensor that detects a state of charge (SOC) of the battery; and a controller that: (i) determines a plurality of different thresholds based upon the measurement from the first sensor; (ii) compares the SOC detected by the second sensor to the plurality of thresholds; and (iii) selectively triggers a plurality or different remedial actions in response to comparing the detected SOC to the plurality of different thresholds.

DETAILED DESCRIPTION

Figure 1:
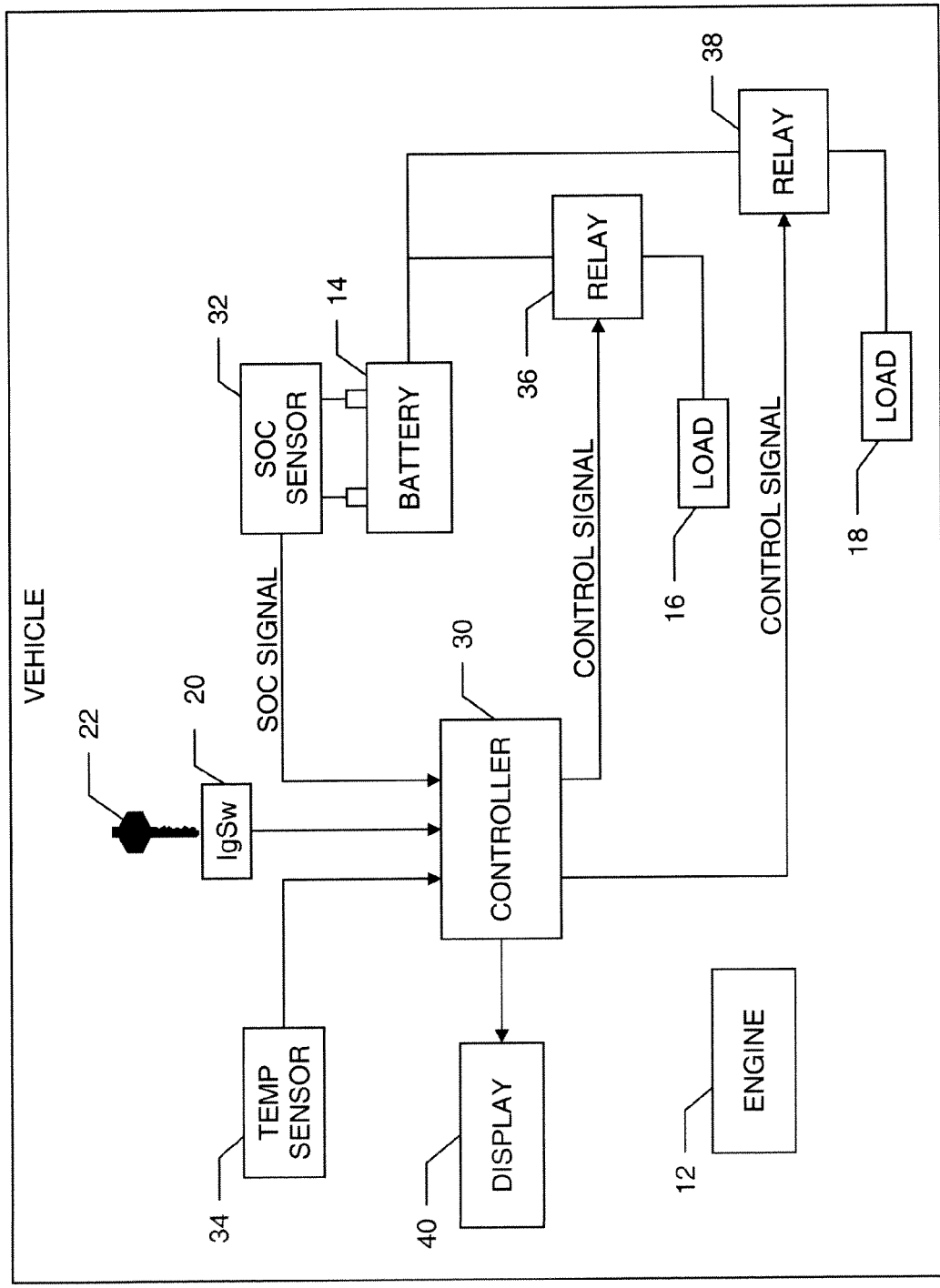
FIG. 1 is a schematic diagram showing an exemplary battery protection system of a vehicle suitable for practicing aspects of the present disclosed subject matter.

Referring now to the drawings, wherein the showings are for purposes of illustrating one or more exemplary embodiments, FIG. 1 shows a schematic diagram of a battery protection system for a vehicle 10, e.g., such an automobile or other similar automotive vehicle. Suitably, the vehicle 10 includes an engine 12 (e.g., an internal combustion engine or the like) that drives the vehicle 10. The vehicle 10 is also provisioned with an electrical system including: a battery 14 which suitably provides a source of electric power for starting the engine 12 of the vehicle 10; and, one or more electric circuits or loads that may also be selectively powered by the vehicle's battery 14. For example, the loads may include: headlights, clocks, electrically powered adjustable components such as seats, mirrors or steering columns, interior cabin lights, electric heaters for seats, mirrors, windows or the like, radios and/or other entertainment systems, electronic memories for recording radio station presets and/or user preferred seat and/or mirror positions, electronic navigation systems, etc. In particular, there are two loads illustrated in FIG. 1, namely, a first load 16 and a second load 18. Optionally, the first load 16 represents, e.g., interior cabin lights for the vehicle 10, while the second load 18 represents, e.g., backup electronic functions—also commonly referred to as "+B" functions. Suitably, the battery is a nominal 12 volt (v) battery of the type commonly employed in automobiles or may be any other type of battery, e.g., typically used in automotive applications.

According to one exemplary embodiment, the vehicle 10 is further equipped or otherwise provisioned with an ignition system for selectively starting and stopping the engine 12 of the vehicle 10. As illustrated in FIG. 1, the ignition system suitably includes an ignition switch 20 or other like device use in conjunction with a key 22, e.g., which can be a conventional cut key, an electronic key or the like. In the usual fashion, the key 22 is optionally manipulated to selectively place the ignition switch 20 in either of two or more positions or states, namely, (i) a key ON position or state, or (ii) a key OFF position or state.

As shown in FIG. 1, the battery protection system includes one or more devices such as relays 36 and 38 or other suitable switches or the like that are arranged between the battery 14 and the loads 16 and 18. Under the control of a controller 30 which is also part of the battery protection system, the relays 36 and 38 are selectively opened and closed. In their open states, each relay disconnects or otherwise isolates its respective the load from the battery 14 so that current or electric power from the battery 14 is cut-off to the corresponding load. That is to say, in practice, when the controller 30 detects one or more selected conditions or otherwise determines that certain criteria are met, the controller 30 sends a suitable control signal to the appropriate relay 36 and/or 38. In response to the control signal, the respective relay 36 and/or 38 is tripped or otherwise set to its open state thereby cutting-off the delivery of electric power or current from the battery 14 to the corresponding load 16 and/or 18. Alternately, in their normally closed states, the respective relays 36 and 38 operatively connect their corresponding loads 16 and/or 18 to the battery 14 so that electric power and/or current can be delivered from the battery 14 to the respective loads 16 and/or 18.

In the illustrated embodiment, the battery protection system also suitably includes: a state of charge (SOC) sensor 32 that senses, detects and/or otherwise determines a SOC or condition of the battery 14; a temperature sensor 34 that senses, detects and/or otherwise determines a temperature of the engine 12, the battery 14 and/or the surrounding ambient temperature; and, a display 40 or other suitable visual, audible or humanly perceivable warning indicator. Suitably, the controller 30 regulates or otherwise controls operation of the relays 36 and 38 and/or the display 40 in response to the SOC or condition of the battery 14 as detected by the sensor 32. As shown, the SOC or condition of the battery 14 is obtained by the controller 30 from the sensor 32 which is electrically and/or otherwise operatively connected to the battery 14 so as to sense and/or otherwise detect the SOC and/or condition of the battery 14.

More specifically, for example, the controller 30 receives a signal representative of a condition or SOC of the battery 14 from the sensor 32. In the illustrated embodiment, the sensor 32 is electrically connected to the battery 14 for determining the SOC and/or condition of the battery 14 and generating an SOC signal representative thereof to send to the controller 30. The SOC signal can be one or more signals that indicate the condition or SOC of the battery 14. The condition can be a value indicating the charge remaining in the battery 14 relative to a scale ranging between a low end where no charge remains in the battery 14 and a high end where the battery 14 is fully charged. In one suitable embodiment, the SOC signal indicates the condition of the battery 14 as related to its overall charge capacity (i.e., a value or percentage of a maximum SOC of the battery 14). In another exemplary embodiment, the SOC signal indicates the percentage of maximum electrical energy output of the battery 14. In either event, suitably the sensor 32 measures or otherwise detects any one or more of a variety of different factors and/or parameters from which the battery's SOC is calculated or otherwise determined. These factors or parameters suitably include but are not limited to, the battery voltage, battery current, charge balance, etc. In practice, any of a variety of well know or otherwise appropriate methods and/or algorithms may optionally be used to calculate or determine the SOC from the respective parameters measured or otherwise obtained by the sensor 32.

In addition to the SOC signal received from the SOC sensor 32, the controller 30 also receives a temperature signal or measurement obtained from the temperature sensor 34. Suitably, the controller 30 uses this temperature signal or measurement to calculate, adjust and/or otherwise determine the values for a plurality of different thresholds. Moreover, the controller 30 also optionally monitors and/or otherwise receives a signal indicative of the state of the ignition switch 20, i.e., ON or OFF. In turn, the controller 30 selectively takes one or more appropriate remedial actions to protect the battery 14 from excessive discharge by comparing the SOC obtained from the SOC sensor 32 to the respective determined thresholds. For example, suitable remedial actions include: (i) selectively disconnecting one or more of the loads 16 and/or 18 from the battery 14 or otherwise cutting-off power from the battery 14 to one or more of the loads 16 and/or 18, e.g., via appropriate control of the respective relays 36 and/or 38; and/or, (ii) selectively output via the display 40 a suitable warning indication regarding the SOC or condition of the battery and/or other indication of the remedial actions taken by the controller 30.

In one suitable embodiment, each threshold value is calculated as a corresponding function of the measured or otherwise obtained temperature. For example, to determine each individual threshold the controller 30 optionally executes the equation $TH_n = f_n(TEMP)$, where $TH_n$ represents the nth threshold and $f_n(TEMP)$ represents a function of the obtained temperature (TEMP) for the nth threshold. Alternately, each threshold may be given or assigned some preset or otherwise determined value in the controller 30 and the obtained temperature is used by the controller 30 to select or determine an offset amount or otherwise adjust each preset threshold value by some set or otherwise determined amount. Suitably, for any given temperature, the offset or adjustment amount may be the same for each threshold or it may vary between different thresholds. In yet another example, a look-up table (LUT) or the like may be provisioned in the controller 30 which relates nominal threshold values and temperature. Accordingly, to determine an actual threshold to which the SOC will be compared by the controller 30, the controller 30 accesses the LUT by cross-referencing a nominal threshold value with the obtained temperature, thereby retrieving the corresponding entry in the LUT to be used as the actual threshold value.

Figure 2:
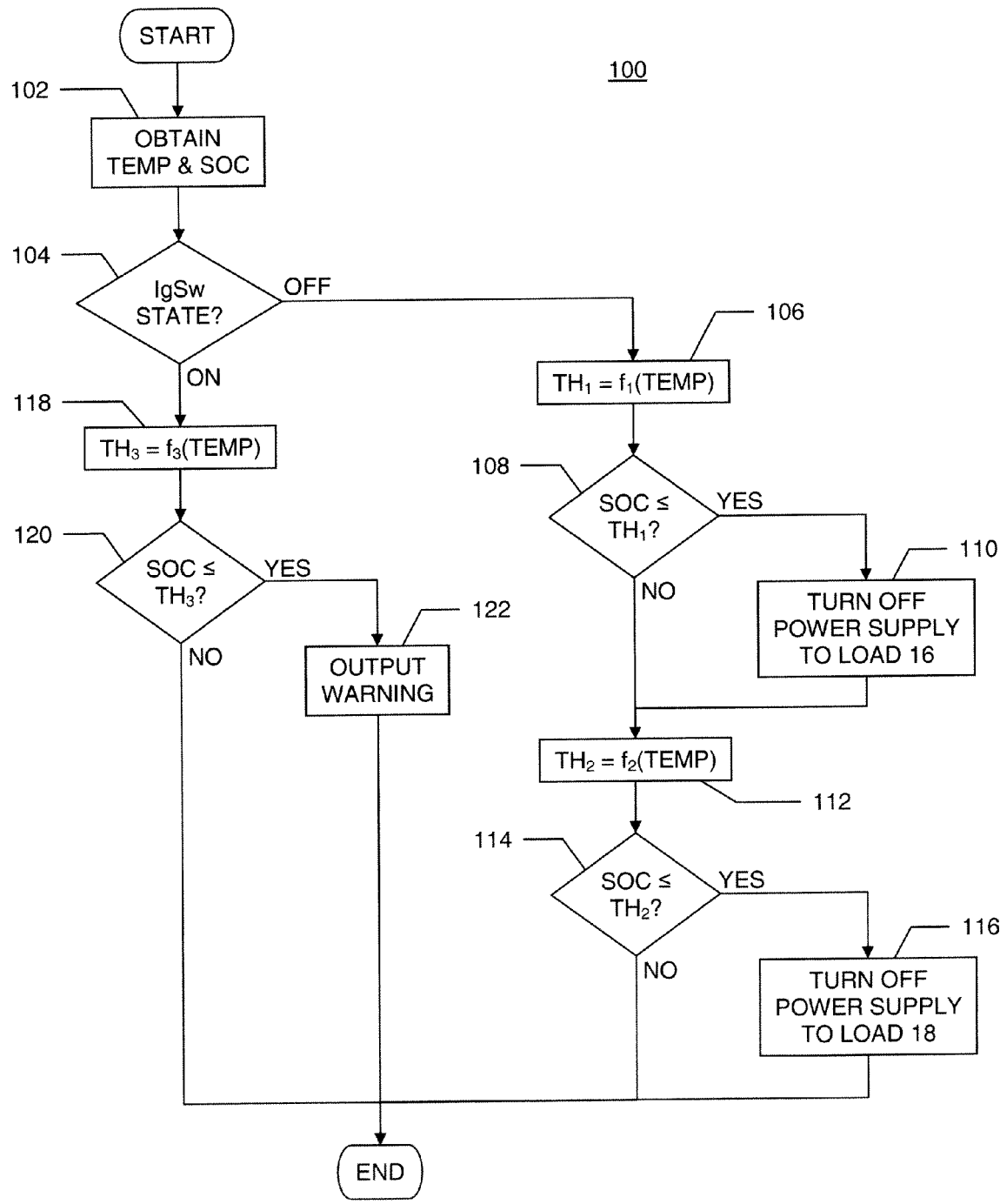
FIG. 2 is a flow chart showing an exemplary process for protecting a battery from excessive discharge in accordance with aspects of the present disclosed subject matter.

With reference now to FIG. 2, there is shown an exemplary process 100 for protecting the battery 14 from excessive discharge. In the illustrated example, three thresholds (namely, $TH_1$, $TH_2$ and $TH_3$) that are calculated or otherwise determined based upon the measured or otherwise obtained temperature from the temperature sensor 34 are employed to selectively trigger corresponding remedial actions by the controller 30 based upon a comparison of the SOC received from the SOC sensor 32 to the respective thresholds. It is to be appreciated, however, that in practice more or less thresholds and/or corresponding remedial actions may in fact be employed as desired for a specific application and/or implementation.

In the illustrated example, at step 102, the controller 30 obtains the temperature signal or measurement from the sensor 34 and the SOC signal or measurement from the sensor 32. At decision step 104, the state of the ignition switch 20 is also obtained by the controller 30 and it is determined if the state of the ignition switch 20 is ON or OFF. If the state of the ignition switch 20 is determined to be ON, then the process 100 continues to step 118, otherwise if the state of the ignition switch is determined to be OFF, then the process 100 branches to step 106.

At step 106, the controller 30 calculates (e.g., from a function $f_1$) and/or otherwise determines a value for a first threshold ($TH_1$) based on the temperature (TEMP) obtained in step 102. In turn, at step 108, the controller 30 compares the SOC obtained in step 102 to the threshold $TH_1$ determined in step 106. If the SOC has met the threshold (i.e., $SOC \leq TH_1$), then the process 100 branches to step 110. At step 110, the controller 30 turns off the power supply from the battery 14 to the load 16, e.g., via suitable control of the relay 36. Optionally, at this point the controller 30 also signals and/or otherwise controls the display 40 to output a corresponding message or other indication of the remedial action being taken, e.g., "Due to Insufficient Battery Level, Your Vehicle's Battery Management System has Forcefully Turned-Off the Interior Lighting." Following step 110, the process 100 continues to step 112. Alternately, if at decision step 108, it is determined that the SOC has not met the threshold (i.e., $SOC>TH_1$), then the process 100 skips step 110 and proceeds directly to step 112.

At step 112, the controller 30 calculates (e.g., from a function $f_2$) and/or otherwise determines a value for a second threshold ($TH_2$) based on the temperature (TEMP) obtained in step 102. In turn, at step 114, the controller 30 compares the SOC obtained in step 102 to the threshold $TH_2$ determined in step 112. If the SOC has met the threshold (i.e., $SOC \leq TH_2$), then the process 100 branches to step 116. At step 116, the controller 30 turns off the power supply from the battery 14 to the load 18, e.g., via suitable control of the relay 38. Optionally, at this point the controller 30 also signals and/or otherwise controls the display 40 to output a corresponding message or other indication of the remedial action being taken, e.g., "Due to Insufficient Battery Level, Your Vehicle's Battery Management System has Forcefully Turned-Off the +B Power Supply." Following step 116, the process 100 suitably end. Alternately, if at decision step 114, it is determined that the SOC has not met the threshold (i.e., $SOC>TH_2$), then the process 100 skips step 116 and proceeds directly to the end of the process 100.

Returning attention now to decision step 104, if it is determined that the ignition switch 20 is in the ON state, then the process 100 continues to step 118. At step 118, the controller 30 calculates (e.g., from a function $f_3$) and/or otherwise determines a value for a third threshold ($TH_3$) based on the temperature (TEMP) obtained in step 102. In turn, at step 120, the controller 30 compares the SOC obtained in step 102 to the threshold $TH_3$ determined in step 118. If the SOC has met the threshold (i.e., $SOC \leq TH_3$), then the process 100 branches to step 122. At step 122, the controller 30 signals and/or otherwise controls the display 40 to output an appropriate warning message or other indication regarding the SOC or condition of the battery 14, e.g., "BATTERY CHARGE LOW—Please Start Engine to Recharge Battery or Turn Vehicle Off to Conserve Battery Condition." Alternately, if at decision step 120, it is determined that the SOC has not met the threshold (i.e., $SOC>TH_3$), then the process 100 skips step 122 and proceeds directly to the end of the process 100.

While one or more of the foregoing embodiments have been described with reference to the battery's SOC, it is to be appreciated that SOC is merely an exemplary parameter that sensed, measured and/or otherwise determined and accordingly used as a basis for adjusting the respective thresholds (e.g., $TH_1$, $TH_2$ and $TH_3$). More generally and/or in alternate embodiments, other parameters indicative of and/or related to the battery's state of function (SOF) may similarly be obtained (i.e., sensed, measure and/or otherwise determined) and accordingly used as a basis for adjusting the respective thresholds. In this regard, examples of the battery's SOF include not only the battery's SOC but also the battery's cranking voltage, the internal resistance of the battery, the battery's reserve capacity, the cold cranking amperes (CCA) of the battery, the battery's health and the like. Accordingly, it is intended that the terms and/or parameters SOC and SOF when used herein may optionally be interchanged where appropriate to achieve various alternate embodiments suitable for particular desired applications.

In any event, it is to be appreciated that in connection with the particular exemplary embodiments presented herein certain structural and/or function features are described as being incorporated in defined elements and/or components. However, it is contemplated that these features may, to the same or similar benefit, also likewise be incorporated in common elements and/or components where appropriate. For example, the sensor 32 and controller 30 may suitably be integrated together. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. For example, the controller 30 and/or sensor 32 may be implemented as appropriate hardware circuits or alternately as microprocessors programmed to implement their respective functions. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, it will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. In a vehicle having a battery that selectively supplies electric power for starting an engine of the vehicle and that selectively supplies electric power to a plurality of electric loads of the vehicle, a method of protecting the battery comprising:
   (a) measuring a temperature of the battery, a temperature of the vehicle's engine and an ambient temperature;
   (b) determining a state of charge (SOC) of the battery;

(c) determining a first threshold based on the measured temperature of the battery, the vehicle's engine, and the ambient temperature;

(d) determining a second threshold based on the measured temperature of the battery, the vehicle's engine, and the ambient temperature, said second threshold being different than the first threshold;

(e) taking a first remedial action if the SOC is below the first determined threshold; and (f) taking a second remedial action if the SOC is below the second determined threshold, said second remedial action being different from the first remedial action.

2. The method of claim 1, said method further comprising:
monitoring a state of an ignition switch of the vehicle, wherein said ignition switch is in either one of an ON state or an OFF state and wherein steps (c) through (f) are only executed when the ignition switch is in the OFF state.

3. The method of claim 2, wherein if the ignition switch is in the ON state, then said method comprises:
omitting steps (c) through (f);
determining a third threshold based on the measured temperature, said third threshold being different from the first and second thresholds; and
taking a third remedial action if the SOC is below the third determined threshold, said third remedial action being different from the first and second remedial actions.

4. The method of claim 3, wherein the first remedial action includes electrically disconnecting a first electric load from the battery.

5. The method of claim 4, wherein the second remedial action includes electrically disconnecting a second electric load from the battery, said second electric load being different from the first electric load.

6. The method of claim 5, wherein the third remedial action includes outputting a humanly perceivable warning indication regarding the SOC of the battery.

7. The method of claim 6 wherein for the same given temperature measured in step (a) the second determined threshold is less than the first determined threshold.

8. The method of claim 7 wherein for the same given temperature measured in step (a) the third determine threshold is between the first and second determined thresholds.

9. In a vehicle having a battery that selectively supplies electric power for starting an engine of the vehicle and that selectively supplies electric power to a plurality of electric loads of the vehicle, a battery protection system comprising:
temperature sensing means for measuring a temperature of the battery, a temperature of the vehicle's engine and an ambient temperature;
battery sensing means for determining a state of charge (SOC) of the battery;
threshold determining means for determining a first threshold and a second threshold based on the temperature of the battery, the vehicle's engine, and the ambient temperature measured by the temperature sensing means, said second threshold being different than the first threshold; and
remedial action means for taking a first remedial action if the SOC is below the first determined threshold and a second remedial action if the SOC is below the second determined threshold, said second remedial action being different from the first remedial action.

10. The battery protection system of claim 9, said battery protection system further comprising:
monitoring means for monitoring a state of an ignition switch of the vehicle, wherein said ignition switch is in either one of an ON state or an OFF state and wherein the first and second remedial actions are only taken by the remedial action means when the ignition switch is in the OFF state.

11. The battery protection system of claim 10, wherein if the ignition switch is in the ON state, then the threshold determining means determines a third threshold based on the temperature measured by the temperature sensing means, said third threshold being different from the first and second thresholds, and the remedial action means takes a third remedial action if the SOC is below the third determined threshold, said third remedial action being different from the first and second remedial actions.

12. The battery protection system of claim 11, wherein the first remedial action includes electrically disconnecting a first electric load from the battery.

13. The battery protection system of claim 12, wherein the second remedial action includes electrically disconnecting a second electric load from the battery, said second electric load being different from the first electric load.

14. The battery protection system of claim 13, further comprising:
an output device, wherein the third remedial action includes outputting on the output device a humanly perceivable warning indication regarding the SOC of the battery.

15. The battery protection system of claim 14, wherein for the same given temperature measured by the temperature sensing means, the second determined threshold is less than the first determined threshold.

16. The battery protection system of claim 15, wherein for the same given temperature measured by the temperature sensing means, the third determine threshold is between the first and second determined thresholds.

* * * * *